(12) United States Patent
Goto et al.

(10) Patent No.: US 10,933,770 B2
(45) Date of Patent: Mar. 2, 2021

(54) POWER SEAT DEVICE

(71) Applicants: IMASEN ELECTRIC INDUSTRIAL CO., LTD., Aichi (JP); NHK SPRING CO., LTD., Kanagawa (JP)

(72) Inventors: Atsutoshi Goto, Aichi (JP); Hiroyuki Kojima, Aichi (JP); Takanari Matsumoto, Aichi (JP); Kenichi Katsube, Kanagawa (JP); Daisuke Tanaka, Kanagawa (JP)

(73) Assignees: IMASEN ELECTRIC INDUSTRIAL CO., LTD., Aichi (JP); NHK SPRING CO., LTD., Kanagawa (JP)

(*) Notice: Subject to any disclaimer, the term of this patent is extended or adjusted under 35 U.S.C. 154(b) by 0 days.

(21) Appl. No.: 16/577,904

(22) Filed: Sep. 20, 2019

(65) Prior Publication Data
US 2020/0156506 A1 May 21, 2020

(30) Foreign Application Priority Data

Nov. 15, 2018 (JP) .............................. JP2018-214365

(51) Int. Cl.
*B60N 2/02* (2006.01)
*B60N 2/10* (2006.01)
*B60N 2/20* (2006.01)

(52) U.S. Cl.
CPC ......... *B60N 2/0252* (2013.01); *B60N 2/0232* (2013.01); *B60N 2/10* (2013.01); *B60N 2/20* (2013.01); *B60N 2002/0272* (2013.01)

(58) Field of Classification Search
CPC . A47C 1/0242; A47C 1/03211; B60N 2/0252; B60N 2002/0272; B60N 2/0232; B60N 2/10; B60N 2/20
See application file for complete search history.

(56) References Cited

U.S. PATENT DOCUMENTS

| 8,958,955 | B2* | 2/2015 | Hotary | B60N 2/06 701/49 |
|---|---|---|---|---|
| 10,188,213 | B2* | 1/2019 | Johnson | A47C 1/121 |
| 10,414,293 | B2* | 9/2019 | Sasaki | B60N 2/3086 |
| 2017/0225591 | A1* | 8/2017 | Tobata | B60N 2/0244 |
| 2017/0341529 | A1* | 11/2017 | Uno | B60N 2/01 |
| 2017/0355282 | A1* | 12/2017 | Zouzal | B60N 2/0232 |
| 2019/0299818 | A1* | 10/2019 | Sasaki | B60N 2/0232 |
| 2020/0156506 | A1* | 5/2020 | Goto | B60N 2/20 |

FOREIGN PATENT DOCUMENTS

JP 2017024602 A 2/2017

* cited by examiner

*Primary Examiner* — Philip F Gabler
(74) *Attorney, Agent, or Firm* — Lucas & Mercanti, LLP

(57) ABSTRACT

A power seat device is configured to acquire a target associated position of a tilted position, corresponding to a current position of a seatback for allowing the seatback to reach an end position in a reclining range, and a seat to reach an end position in a tilting range simultaneously. Outputs of a reclining motor and a tilting motor are adjusted so that the tilted position coincides with the acquired target associated position.

4 Claims, 5 Drawing Sheets

US 10,933,770 B2

POWER SEAT DEVICE

CROSS REFERENCE TO RELATED APPLICATION

This Application claims the priority of Japanese Patent Application No. 2018-214365 filed on Nov. 15, 2018, which is incorporated herein by reference.

BACKGROUND OF THE INVENTION

Field of the Invention

The present invention relates to a power seat device configured to perform reclining of a seatback and tilting of a seat in association with each other.

Description of the Related Art

Japanese Patent Laid-Open No. 2017-24602 discloses a vehicle seat configured to perform parallel movement of a seat cushion and reclining of a seatback in association with each other.
Patent Literature: Japanese Patent Laid-Open No. 2017-24602

The inventors of the present invention have conceived of an idea to establish reclining of a seatback in association with tilting of a seat. An individual difference in a reclining motor or a tilting motor, and a load that fluctuates in accordance with an occupant's weight may vary motor operation speed. As a result, a seating posture is changed by a difference in the motor operation speed, and an association failure occurs, that is, one of a reclining motion and a tilting motion is terminated earlier than the other to be continuing. As a result, the seated occupant is expected to feel discomfort.

The present invention aims at solving the above mentioned problem and provides a power seat device capable of controlling the seatback to be reclined to an end position in a reclining range, and the seat to be tilted to an end position in a tilting range simultaneously.

SUMMARY OF THE INVENTION

A power seat device 10 according to the present invention includes a reclining motor 14 that reclines a seatback 12, a tilting motor 18 that tilts a seat cushion (seat frame) 16, and a switch SW1 that drives the reclining motor and the tilting motor simultaneously. The power seat device includes a correspondence position acquisition unit (S18) that acquires a correspondence position between a reclined position of the seatback and a tilted position of the seat for allowing the seatback to reach an end position in a reclining range and allowing the seat to reach an end position in a tilting range simultaneously, and an output adjustment unit (S20 to S30) that adjusts at least one of outputs of the reclining motor and the tilting motor to establish the acquired correspondence position.

The power seat device according to the present invention is configured to obtain a correspondence position between the reclined seatback position and the titled seat position to allow the seatback to be reclined to the end position in the reclining range, and the seat to be tilted to the end position in the tilting range simultaneously. In order to establish the obtained correspondence position, an output of at least one of the reclining motor and the tilting motor is adjusted. This allows the seatback to reach the end position in the reclining range, and the seat to reach the end position in the tilting range simultaneously without giving discomfort to the seated occupant.

DETAILED DESCRIPTION OF THE PREFERRED EMBODIMENT

Figure 1:
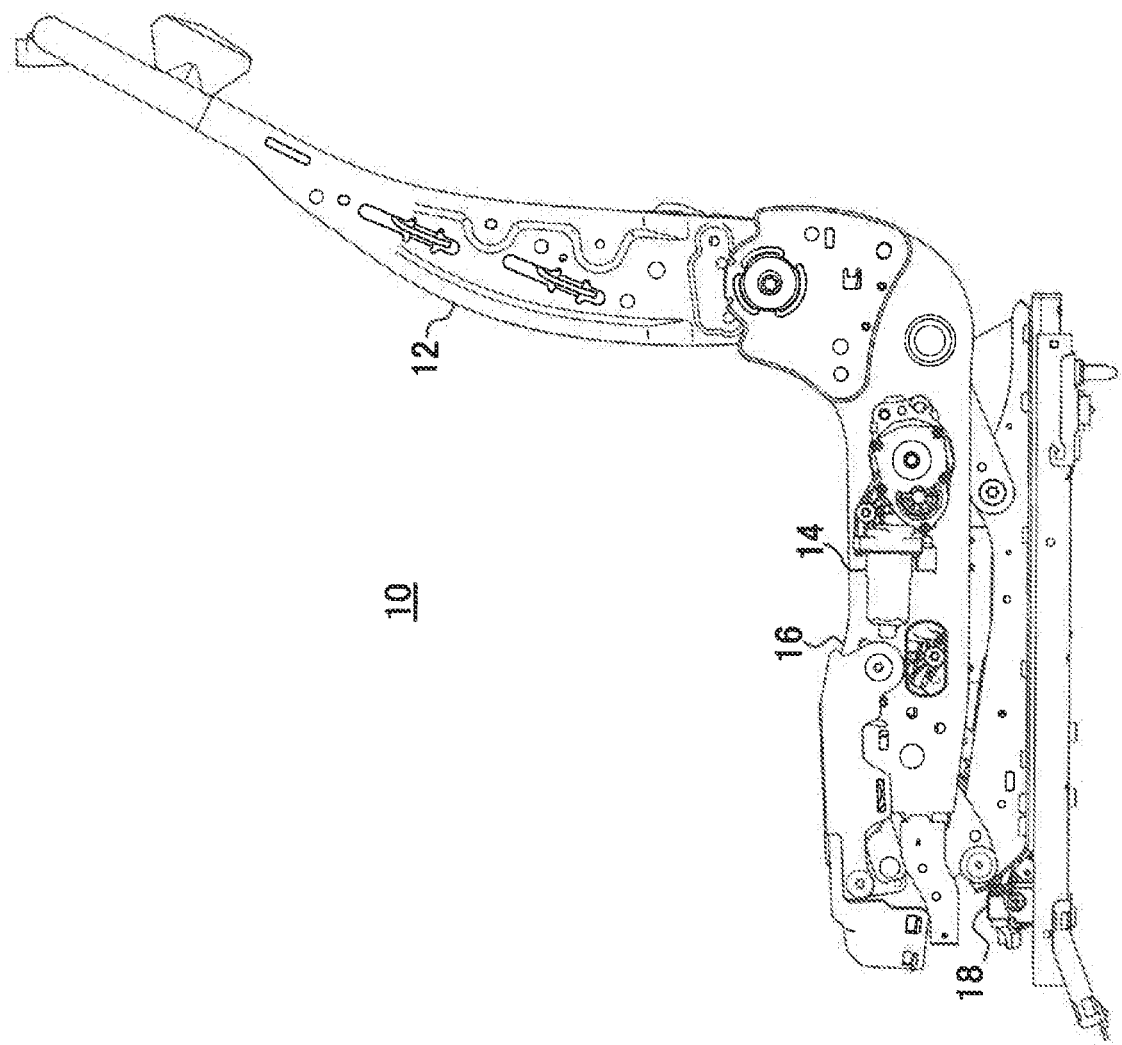
FIG. 1 is a side view conceptually showing an example of a vehicle seat having a power seat device according to the present invention installed therein when a seatback is in the most forward reclined position.
Figure 2:
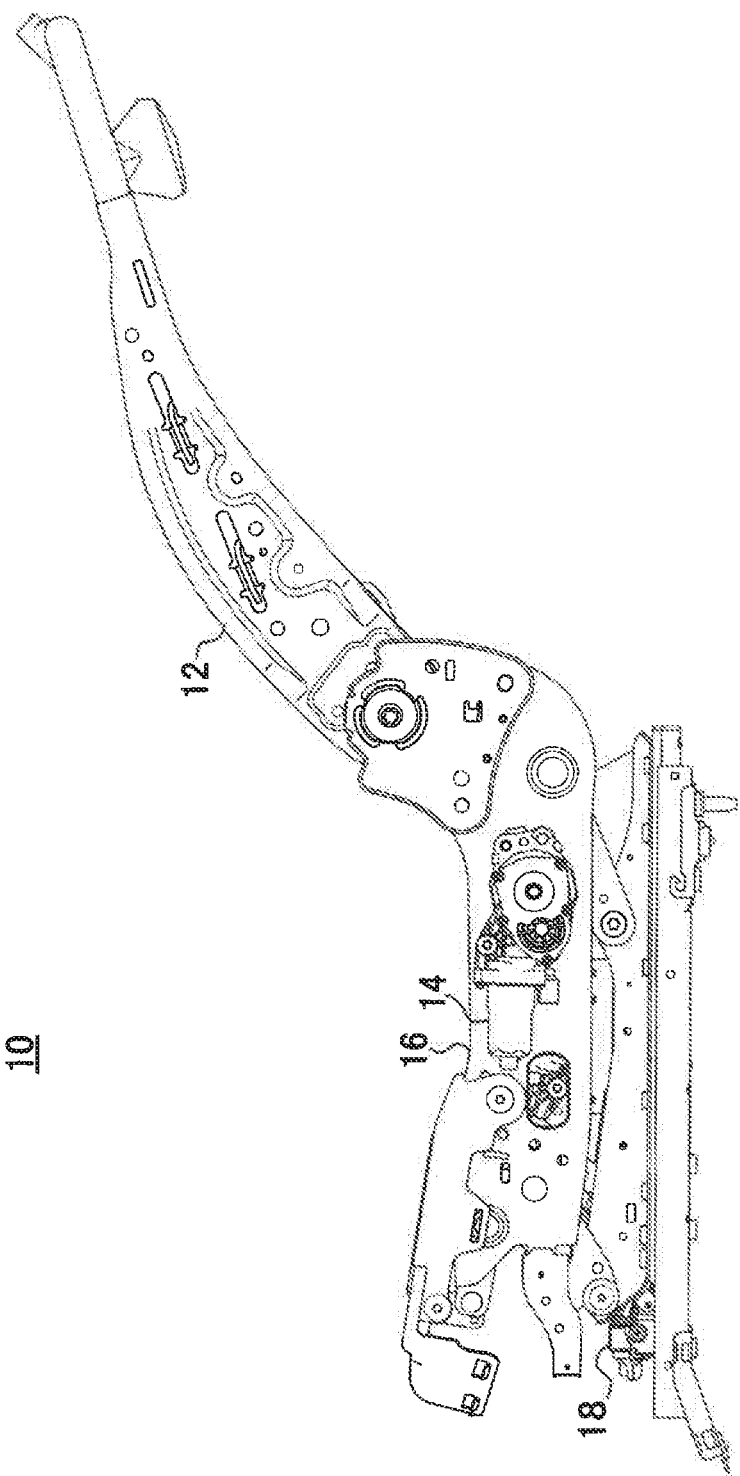
FIG. 2 is a side view conceptually showing an example of the vehicle seat having the power seat device according to the present invention installed therein when the seatback is in the most backward reclined position.

A power seat device 10 according to the present invention will be described referring to the drawings. FIG. 1 and FIG. 2 are side views each showing the structure of the power seat device according to an embodiment of the present invention.

As FIG. 1 and FIG. 2 show, the power seat device 10 according to the embodiment includes a seat frame 16 that accommodates an occupant to be seated thereon, and a seatback 12 that is reclinable with respect to the seat frame 16 for receiving the occupant's back.

The seat frame 16 has its front side tilted (raised) by a tilting motor 18 that is disposed at the lower front of the seat frame 16. The seatback 12 is reclinable with respect to the seat frame 16 in accordance with a rotation drive applied by a reclining motor 14 disposed at the side of the seat frame 16. The power seat device 10 according to the embodiment is configured to allow the tilting motor 18 to be operated in association with the reclining motor 14.

FIG. 1 shows the power seat device 10 when the seatback 12 is in the most forward reclined position (hereinafter referred to as a reclining front end). When the seatback 12 is in the reclining front end position, the front side of the seat frame 16 is in the lowest position (hereinafter referred to as a low end position). FIG. 2 shows the power seat device 10 when the seatback 12 is positioned in the most backward reclined position (hereinafter referred to as a reclining back end). When the seatback 12 is in the reclining back end position, the front side of the seat frame 16 is in the highest position (hereinafter referred to as a high end position).

When reclining the seatback 12 backward to increase the reclining angle from the state in which the seatback 12 is in the reclining front end position, and the front side of the seat frame 16 is in the low end position as shown in FIG. 1, the front side of the seat frame 16 is raised simultaneously. When reclining the seatback 12 forward (raised) to decrease the reclining angle from the state in which the seatback 12 is in the reclining back end position, and the front side of the seat frame 16 is in the high end position as shown in FIG. 2, the front side of the seat frame 16 is lowered simultaneously. When reclining the seatback 12 backward to increase the reclining angle from the state in which the seatback 12 is in the intermediate position between the reclining front end as shown in FIG. 1 and the reclining back end as shown in FIG. 2, the front side of the seat frame 16 is raised simultaneously. When reclining the seatback 12 forward to decrease the reclining angle from the above-described state, the front side of the seat frame 16 is lowered simultaneously.

Figure 3:
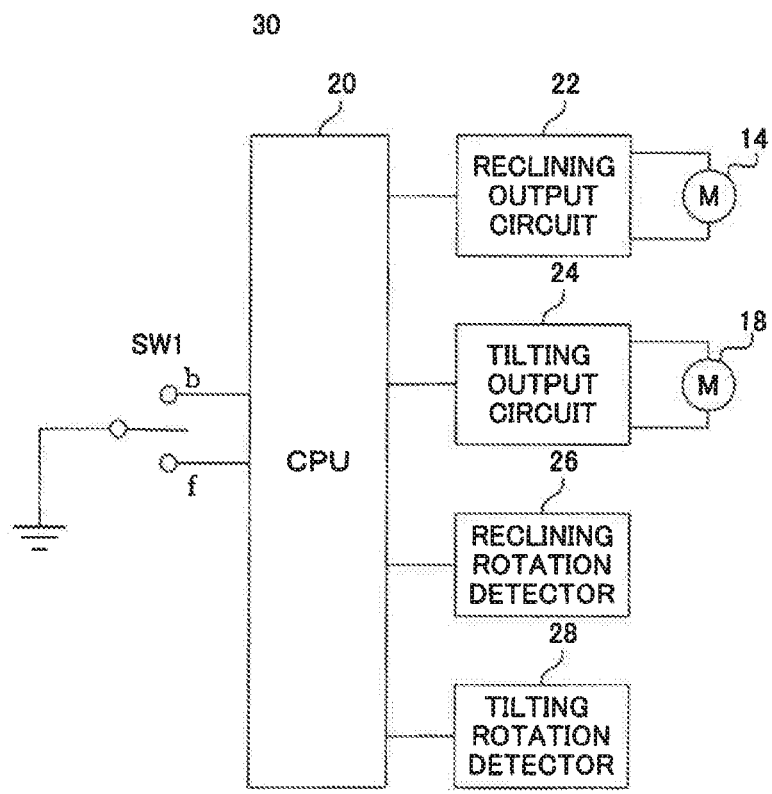
FIG. 3 is a block diagram of a control section of the power seat device.

FIG. 3 shows a structure of a control section of the power seat device 10 according to the embodiment.

A control section 30 includes a CPU 20 that executes arithmetic and control operations, a reclining output circuit 22 that supplies an output to the reclining motor 14, a tilting output circuit 24 that supplies an output to the tilting motor 18, a reclining rotation detector (reclining sensor) 26 that outputs a rotation speed of the reclining motor 14 for detecting the reclined position of the seatback, a tilting rotation detector (tilting sensor) 28 that outputs a rotation speed of the tilting motor 18 for detecting a tilted position, and a switch SW1 that allows execution of both reclining and tilting operations simultaneously. Upon connection of the switch SW1 to a contact b, the seatback 12 is reclined backward to increase the reclining angle, and simultaneously, the front side of the seat frame 16 is raised. Upon connection of the switch SW1 to a contact f, the seatback 12 is reclined forward (raised) to decrease the reclining angle, and simultaneously, the front side of the seat frame 16 is lowered.

In a state where the power seat device 10 according to the embodiment has the seatback 12 either in the reclining front end position as shown in FIG. 1, or in the intermediate position between the reclining front end as shown in FIG. 1 and the reclining back end as shown in FIG. 2, upon connection of the switch SW1 to the contact b, the seatback 12 is reclined backward to increase the reclining angle, and simultaneously, the front side of the seat frame 16 is raised. Simultaneously with the timing when the seatback 12 reaches the reclining back end position as shown in FIG. 2, the front side of the seat frame 16 reaches the high end position.

In a state where the power seat device 10 according to the embodiment has the seatback 12 either in the reclining back end position as shown in FIG. 2, or in the intermediate position between the reclining front end as shown in FIG. 1 and the reclining back end as shown in FIG. 2, upon connection of the switch SW1 to the contact f, the seatback 12 is reclined forward (raised) to decrease the reclining angle, and simultaneously, the front side of the seat frame 16 is lowered. Simultaneously with the timing when the seatback 12 reaches the reclining front end position as shown in FIG. 1, the front side of the seat frame 16 reaches the low end position.

Figure 5A:
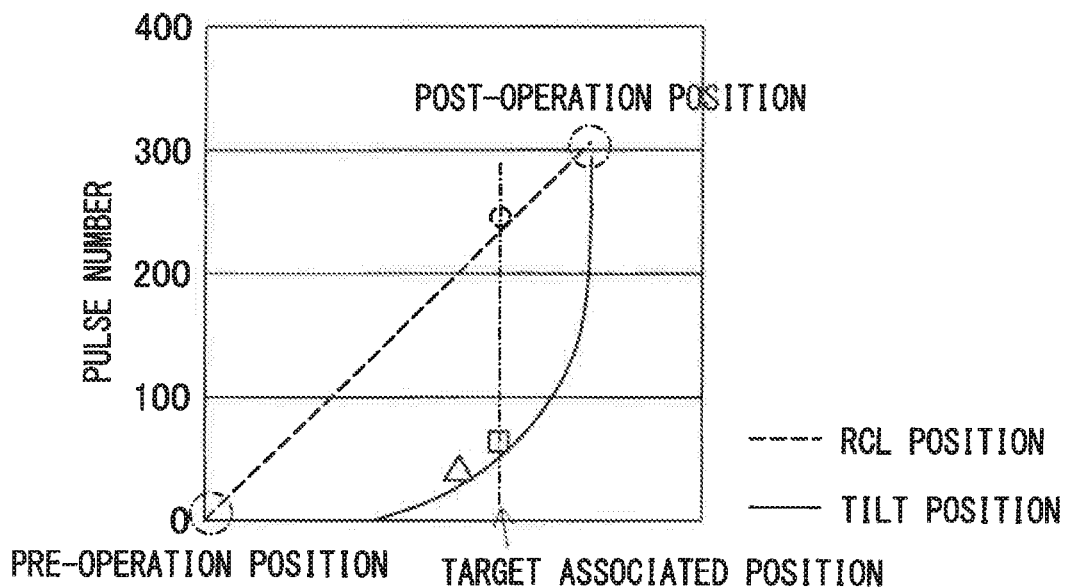
FIG. 5A and FIG. 5B represent a pulse number correlation between a reclining motor and a tilting motor.
Figure 5B:
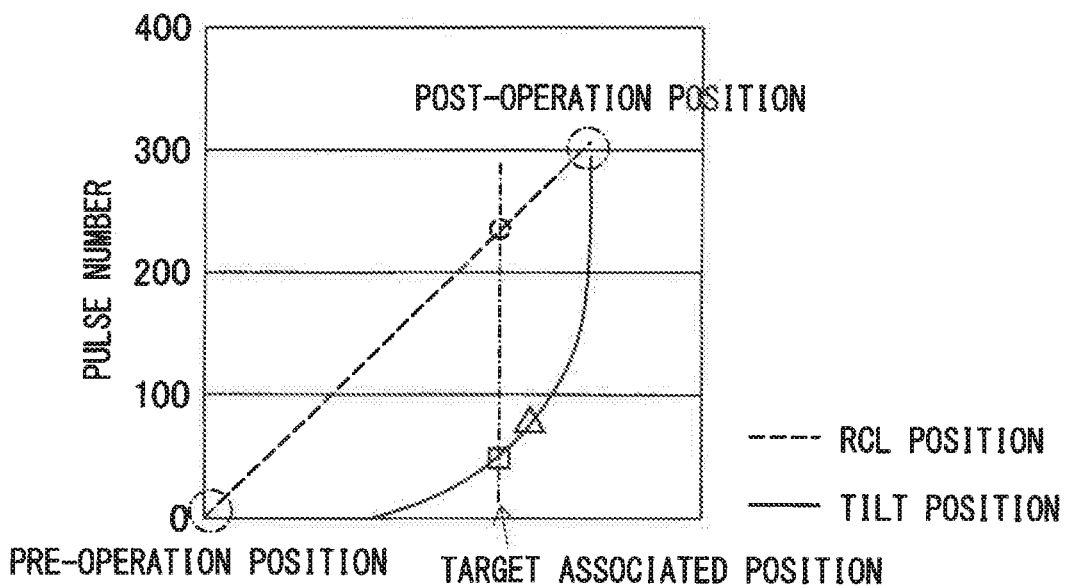

FIG. 5A and FIG. 5B graphically represent operating principles of the power seat device according to the embodiment. A Y-axis denotes a pulse number, and an X-axis denotes a position. Each graph represents a pulse number correlation between the reclining (RCL) motor and the tilting (TILT) motor. It is determined whether a current position (Y) of tilting (TILT) lags behind or precedes a target associated position (Yt) of the tilting (TLT) corresponding to a current position (X) of reclining (RCL). Based on the determination, the output of the motor in the preceding side is lowered to maintain the positional relationship between the reclining (RCL) and the tilting (TILT).

The seatback 12 is supposed to be in the reclining front end position as shown in FIG. 1, or in the intermediate position between the reclining front end position as shown in FIG. 1 and the reclining back end position as shown in FIG. 2 at a timing when the seatback 12 is reclined backward to increase the reclining angle upon starting of the operation in response to connection of the switch SW1 to the contact b. This state represents a pre-operation position to be used in reference to FIG. 5A and FIG. 5B. A post-operation position represents the state in which the seatback 12 is in the reclining backward end position as shown in FIG. 2, and the front side of the seat frame 16 is in the high end position. Conversely, the seatback 12 is supposed to be in the reclining back end position as shown in FIG. 2, or in the intermediate position between the reclining front end position as shown in FIG. 1 and the reclining back end position as shown in FIG. 2 at the timing when the seatback 12 is reclined forward (raised) to decrease the reclining angle in response to connection of the switch SW1 to the contact f. The post-operation position represents the state in which the seatback 12 is in the reclining front end position as shown in FIG. 1, and the front side of the seat frame 16 is in the low end position.

FIG. 5A represents that the tilting (TILT) position indicated by a solid line lags behind the reclining (RCL) position indicated by a broken line. A mark ○ denotes the current position (X) of the reclining (RCL), □ denotes the target associated position (Yt) of the tilting (TILT), and ▲ denotes the current position (Y) of the tilting (TILT). Referring to the graph, the current position (Y) of the tilting (TILT) marked ▲ lags behind the target associated position (Yt) of the tilting (TILT) marked □.

If the reclining (RCL) precedes as shown in FIG. 5A, the deviation Yt-Y is obtained. Outputs of the reclining (RCL) motor and the tilting (TILT) motor are adjusted using a coefficient as an arbitrary number as follows.

Reclining (RCL) output=100%−(deviation×coefficient); and

Tilting (TILT) output=100%

FIG. 5B represents that the tilted (TILT) position indicated by the solid line precedes the reclined (RCL) position indicated by the broken line. The current position (Y) of the tilting (TILT) marked ▲ precedes the target associated position (Yt) of the tilting (TILT) marked □ corresponding to the current position (X) of the reclining (RCL) marked ○.

If the tilting (TILT) precedes as shown in FIG. 5B, the deviation Y-Yt is obtained. Outputs of the reclining (RCL) motor and the tilting (TILT) motor are adjusted using a coefficient as an arbitrary number as follows.

Reclining (RCL) output=100%; and

Tilting (TILT) output=100%−(deviation×coefficient).

Figure 4:
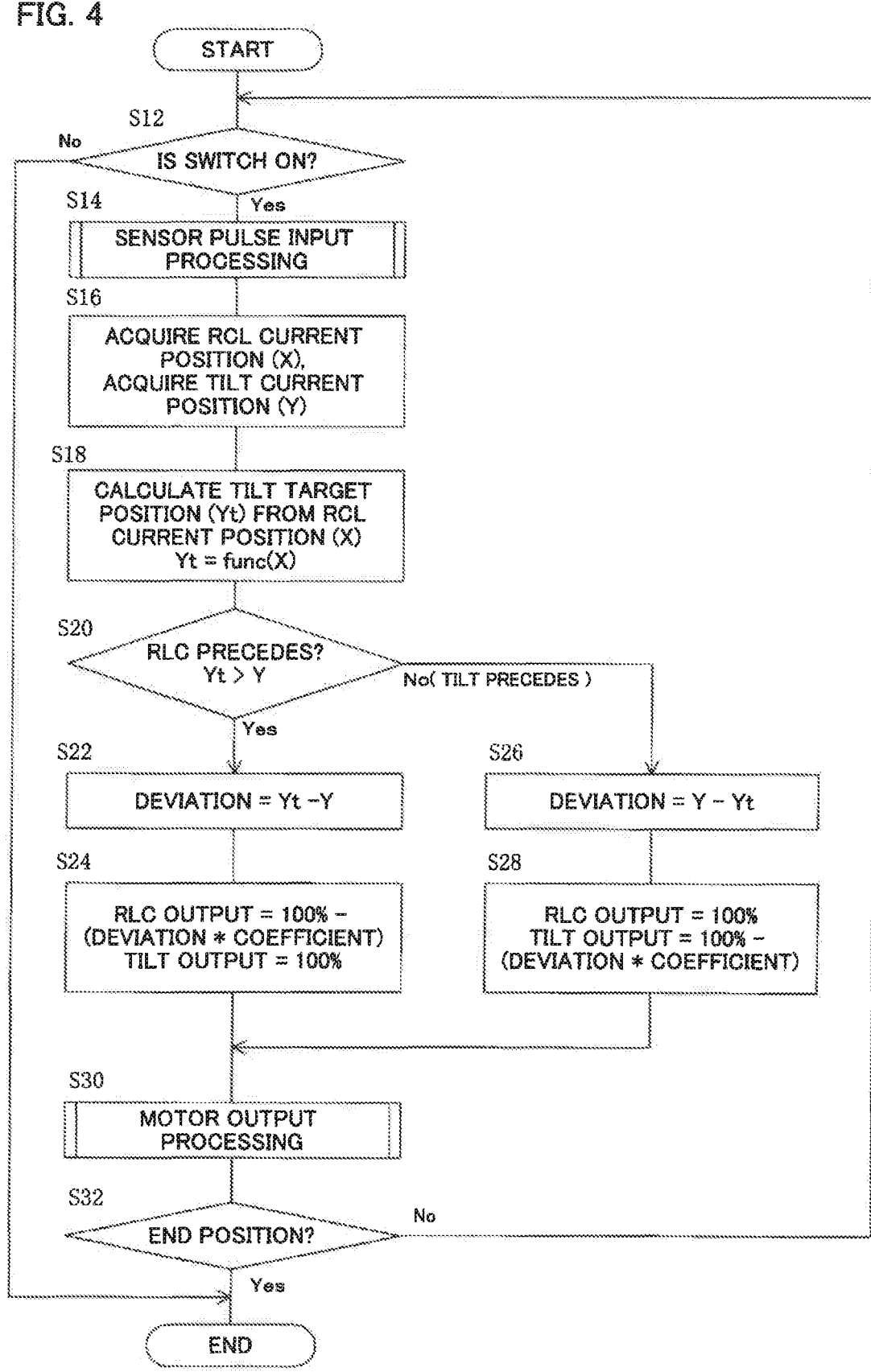
FIG. 4 is a flowchart showing process steps for controlling the power seat device according to an embodiment.

FIG. 4 is a flowchart showing process steps executed by the CPU 20 for controlling the power seat device according to the embodiment. An explanation will be made on the assumption that the seatback 12 is in the pre-operation position, that is, intermediate position between the reclining front end position as shown in FIG. 1 and the reclining back end position as shown in FIG. 2 having the switch SW1 connected to the contact b to recline the seatback 12 backward to increase the reclining angle. The seatback 12 then reaches the reclining back end position, and simultaneously, the front side of the seat frame 16 reaches the high end position.

When the switch SW1 is connected to the contact b (S12; Yes), the CPU 20 as shown in FIG. 3 processes inputs of sensor pulses from the reclining rotation detector 26 for detecting the rotation of the reclining motor 14, and the tilting rotation detector 28 for detecting the rotation of the tilting motor 18 (S14), and acquires the current position (X) of the reclining (RCL) and the current position (Y) of the tilting (TILT) (S16). The CPU 20 then obtains the target associated position (Yt) of the tilting (TILT) from the current position (X) of the reclining (RCL)(S18). The processing executed in S18 corresponds to an exemplary processing to be executed by a "correspondence position acquisition unit".

The CPU 20 determines whether the reclining (RCL) precedes, in other words, the target associated position (Yt) of the tilting (TILT) precedes the current position (Y) of the tilting (TILT)(S20). If it is determined that the reclining (RCL) precedes (S20: Yes), the deviation Yt-Y is obtained (S22). Each output of the reclining (RCL) motor and the tilting (TILT) motor is calculated using the coefficient as an arbitrary number as follows (S24):

Reclining (RCL) output=100%−(deviation×coefficient); and

Tilting (TILT) output=100%.

The CPU 20 sends the calculated motor outputs (S30) to instruct the reclining output circuit 22 and the tilting output circuit 24 (S30) so that the outputs of the reclining motor 14 and the tilting motor 18 are adjusted. In the above-described case, the output of the reclining motor 14 is lowered to coincide the current position (Y) of the tilting (TILT) with the target associated position (Yt) of the tilting (TILT).

Conversely, if it is determined that the reclining (RCL) does not precede (S20: No), the deviation Y-Yt is obtained (S26). Each output of the reclining (RCL) motor and the tilting (TILT) motor is calculated (S28) as follows:

Reclining (RCL) output=100%; and

Tilting (TILT) output=100%−(deviation×coefficient).

The CPU 20 sends the calculated motor outputs to instruct the reclining output circuit 22 and the tilting output circuit 24 (S30) so that the outputs of the reclining motor 14 and the tilting motor 18 are adjusted. In the above-described case, the output of the tilting motor 18 is lowered to coincide the current position (Y) of the tilting (TILT) with the target associated position (Yt) of the tilting (TILT). Process steps from S20 to S30 correspond to an exemplary processing to be executed by an "output adjustment unit".

Process steps from S12 to S30 are repeatedly executed (S32: No) until the seatback 12 reaches the reclining back end position, and the front side of the seat frame 16 reaches the high end position. When the seatback 12 reaches the reclining back end position, and the front side of the seat frame 16 reaches the high end position (S32: Yes), the process ends.

Upon connection of the switch SW1 to the contact f, the similar process steps will be executed. The reclining motor 14 and the tilting motor 18 are rotated in the reverse direction. The seatback 12 is reclined forward (raised) to decrease the reclining angle, and the front side of the seat frame 16 is lowered. When the seatback 12 reaches the reclining front end as shown in FIG. 1, and simultaneously, the front side of the seat frame 16 reaches the low end position (S32: Yes), the process ends.

The power seat device according to the embodiment obtains the correspondence position between the reclining back end position of the seatback and the tilting position of the seat in order to allow the seatback to reach the end position in the reclining range, and the seat to reach the end position in the tilting range, simultaneously (S18). The outputs of the reclining motor and the tilting motor are adjusted to establish the obtained correspondence position (S20 to S30). When the seatback 12 is reclined forward (raised) to decrease the reclining angle, the front side of the seat frame 16 reaches the low end position simultaneously with the timing when the seatback 12 reaches the reclining front end position as shown in FIG. 1. When the seatback 12 is reclined backward to increase the reclining angle, the front side of the seat frame 16 reaches the high end position simultaneously with the timing when the seatback 12 reaches the reclining back end as shown in FIG. 2. This ensures to prevent the occupant from feeling discomfort owing to the association failure, that is, one of the tilting motion and the reclining motion is terminated earlier than the other to be continuing. Furthermore, the synchronous motions of tilting and reclining as designed may give the natural riding comfort to the occupant in reclining.

The power seat device 10 according to the embodiment serves to lower the output of one of the reclining motor 14 and the tilting motor 18, which precedes the other to establish the synchronous motions of reclining and tilting. This makes it possible to facilitate easy control operations as well as prevent application of excessive loads to the motor.

REFERENCE SIGNS LIST

10 power seat device
12 seatback
14 reclining motor
16 seat frame
18 tilting motor
20 CPU
22 reclining output circuit
24 tilting output circuit
26 reclining rotation detector
28 tilting rotation detector
SW1 switch

What is claimed is:

1. A power seat device comprising:
a seat;
a seatback rotatably connected to the seat;
a reclining motor adapted to recline the seatback;
a tilting motor adapted to tilt the seat;
a switch adapted to drive the reclining motor and the tilting motor simultaneously;
a correspondence position acquisition unit adapted to acquire a correspondence position between a reclined position of the seatback and a tilted position of the seat for allowing the seatback to reach an end position in a reclining range and allowing the seat to reach an end position in a tilting range simultaneously; and
an output adjustment unit adapted to adjust at least one of outputs of the reclining motor and the tilting motor to establish the acquired correspondence position.

2. The power seat device according to claim 1, further comprising:
a reclining sensor adapted to detect a reclined position of the seatback; and
a tilting sensor adapted to detect a tilted position of the seat.

3. The power seat device according to claim 1, wherein:
the end position in the reclining range of the seatback includes a most forward reclined position, and a most backward reclined position;
the end position in the tilting range of the seat includes a lowest position of a front side of the seat, and a highest position of the front side of the seat; and
the correspondence position acquisition unit is adapted to acquire the correspondence position between the reclined position of the seatback and the tilted position of the seat to establish at least one of a first state in which the seatback reaches the most forward reclined position, and the front side of the seat reaches the lowest position simultaneously, and a second state in which the seatback reaches the most backward reclined position, and the front side of the seat reaches the highest position simultaneously.

4. The power seat device according to claim 1, wherein:
the correspondence position acquisition unit is adapted to acquire the correspondence position of the tilted seat, corresponding to a current reclined position of the seatback;
the output adjustment unit is adapted to determine whether a current tilted position of the seat precedes the acquired correspondence position;
if it is determined that the tilted position precedes, the output of the tilting motor is lowered; and
if it is determined that the tilted position does not precede, the output of the reclining motor is lowered.

* * * * *